Patented May 4, 1937

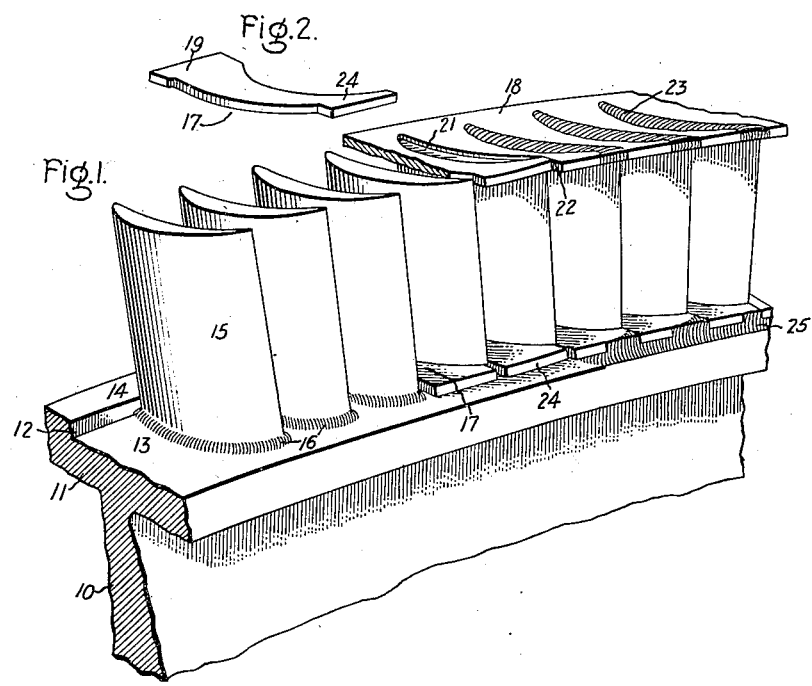
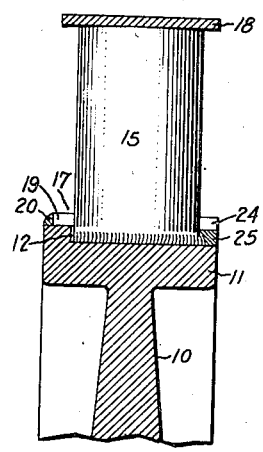

2,079,473

UNITED STATES PATENT OFFICE 2,079,473

NOZZLE DIAPHRAGM AND THE LIKE AND METHOD OF MAKING THE SAME

Raymond B. Wade, Swampscott, Mass., assignor to General Electric Company, a corporation of New York Application July 18, 1935, Serial No. 32,001

4 Claims. (Cl. 29—156.8)

The present invention relates to nozzle diaphragms, bucket wheels and like articles comprising a plurality of partition members or blades held by and securely fastened to the surface of a holding member. The invention relates more particularly to nozzle diaphragms and bucket wheels used in elastic fluid turbines as a means for directing a stream of elastic fluid and converting available energy from such fluid into mechanical energy. Specifically, the invention relates to the kind of nozzle diaphragms and like articles in which a plurality of partition members are secured in spaced relation to a substantially cylindrical surface of a ring, a disk or like holding member by means of welds. The welding material securing the partitions or blades to such cylindrical surfaces usually forms a rough, uneven surface and makes it necessary to smooth the surface of the weld by filing the welded portions in order to form a smooth passage for elastic fluid which passage offers a minimum resistance to flow. The partitions or blades in modern steam turbine design are usually curved and have a comparatively thin edge. Welding of the thin edge portion is difficult and in many cases the thin edge portion near the welding seam is destroyed due to the intensive heat liberated near said edge portion during the welding process.

One object of my invention is to provide an improved construction of such nozzle diaphragms and bucket wheels, rendering them reliable and efficient in operation.

Another object of my invention is to provide an improved method of manufacturing nozzle diaphragms and like articles whereby they may be produced at relatively low cost.

For a consideration of what I believe to be novel and my invention, attention is directed to the following description and the claims appended thereto in connection with the accompanying drawing.

In the drawing, Fig. 1 is a perspective view, partly broken away, of a turbine bucket wheel embodying my invention; Fig. 2 is a spacing member used in the arrangement of Fig. 1; and Fig. 3 is a sectional view of Fig. 1.

The bucket wheel shown in the drawing comprises a disk or holding member 10 having a rim 11 with an outer, cylindrical surface, which surface in accordance with my invention is shaped to define a shoulder 12. From another viewpoint, an outer portion of the rim is removed or cut away to define two coaxial, cylindrical or concentric surfaces 13 and 14. The surface 14 is defined by a radial projection on the edge of the rim 11. A plurality of blades, partitions or like elements 15 are secured in spaced relation to the surface 13 of the rim by welds 16. The welds may be formed by any known welding process, preferably by flash-welding. The blades are spaced in a predetermined manner, in the present instance they are uniformly spaced apart along the circumference of the rim and they are also slightly spaced from the shoulder 12. Spacing means including inner spacers 17 and outer spacers in the form of a band 18 hold the blades in position. The inner spacers 17, as shown in perspective in Fig. 2, have a rear portion 19 and a front portion 24. In the construction of Fig. 1 the inner spacers 17 are slightly radially spaced from the surface 13 so that they do not interfere with the rough surfaces of the welds 16. During manufacture the blades 15 are successively secured to the surface 13 of the rim by means of fused metal or welding. Thereafter the inner spacers 17 are inserted intermediate adjacent blades 15 so that the rear portions 19 of the spacers 17 contact the surface 14. The rear spacer portions 19 then are united to the rim surface 14 by a weld 20 which may be accomplished advantageously by an automatic circular welding machine. When this is done, the outer ends of the blades 15 are connected together and prevented from relative movement by the provision of the outer spacers 18. The latter in the present instance form a band or bands with a plurality of openings 21 for receiving the ends of the blades. The portions of the openings 21 for receiving the thin edge portions of the blades are somewhat wider than said edge portions. This permits manufacture of the band 18 with the openings 21 by a punching process, as is more fully described in the patent to E. D. Dickinson, No. 1,923,264, filed March 25, 1932, and assigned to the same assignee as the present application.

The edge of the band 18 adjacent the thin blade portion has saw-cuts 22. During manufacture the band 18 is secured to the outer ends of the bucket blades or partitions by a few welds. Thereafter the edge portions of the band 18 intermediate adjacent saw-cuts are forced or pinched towards the blades to form good contact between the band 18 and the blades. Finally, the outer ends of the blades are secured to the band 18 by welds 23. It is noted that the welds 23 face away from the passages defined intermediate adjacent blades or partition means so that the rough surfaces of the welds 23 do not form an obstruction to the flow of fluid passing through the passages defined between adjacent blades or partitions.

In the present instance the openings defined by the inner spacer 17 adjacent the thin edge portions of the blades are also somewhat wider than the thickness of the thin blade portions. Therefore, the spacers, having been secured to the rim by the welds 20, are pinched so that their front portions 24 (Fig. 2) are forced into contact with the adjacent sides of the blades. This method and arrangement permits the use of the same spacers 17 for different combinations. The front portions 24 of the inner spacers 17 finally are secured to the surface 13 of the rim by a circular weld 25 which also unites the spacer 17 and the cylindrical surface with the thin edge portions of the blades.

By my invention a smooth passage for the flow of elastic fluid is formed through the nozzle passages between adjacent blades, in particular also along the corners defined by the contour of the spacers 17 and 18 with the blades 15. Smoothing of the welds 16 is no longer necessary because the outer surface of the welds no longer forms the passages, hence is not contacted by the fluid flowing therethrough. It will be readily understood that the smoothing of the welds 16 takes considerable time and thereby forms an important item in the manufacturing cost of bucket wheels and like articles. Elimination of this expenditure reduces considerably the manufacturing cost of such articles.

Having described the method according to my invention, together with the apparatus for carrying out the method, I wish to have it understood that changes may be made in both the apparatus and the method without departing from the spirit of my invention and the scope of the appended claims.

What I claim as new and desire to secure by Letters Patent of the United States is:

1. The method of manufacturing a structure including a holding member having a cylindrical surface with a plurality of partitions secured thereto, said method comprising the steps of welding the ends of a plurality of partitions to the cylindrical surface of a holding member with one end of each partition abutting the surface and thereafter providing a spacer intermediate adjacent partitions in slightly radially spaced relation from the surface and providing welds between the cylindrical surface and the ends of the spacer so that the welds do not form a part of the passages defined between the partitions.

2. The method of manufacturing turbine bucket wheels, diaphragms and like structures comprising the steps of forming a member with a first cylindrical surface and a second cylindrical surface concentrically spaced from the first cylindrical surface, welding a plurality of partition members to the first cylindrical surface with one end of each partition member abutting the surface and thereafter welding a plurality of spacers to the second cylindrical surface.

3. The method of manufacturing turbine bucket wheels, diaphragms and like structures comprising the steps of forming a member with a first cylindrical surface and a second cylindrical surface concentrically and axially spaced from the first cylindrical surface, welding a plurality of partition members to the first cylindrical surface with one end of each partition member abutting the surface, welding thereafter the end of a spacer to the second cylindrical surface intermediate adjacent partition members, providing spacing means on the free ends of the partition members and securing the spacing means to the partition members by welds facing away from the passages defined intermediate adjacent partition members.

4. An article of manufacture comprising a holding member having two concentric axially spaced cylindrical surfaces defining a shoulder between them, a plurality of partitions defining passages, said partitions abutting the shoulder and having ends welded to one of the surfaces, and a spacer between adjacent partitions having end portions secured to the surfaces, opposite edges of the spacer and adjacent sides of the partitions forming smooth corners which offer a minimum resistance to the flow of a fluid passing through the passages defined between adjacent partitions.

RAYMOND B. WADE.